US009337903B2

(12) United States Patent
Smith

(10) Patent No.: US 9,337,903 B2
(45) Date of Patent: *May 10, 2016

(54) ANTENNA SOLUTION FOR WIRELESS POWER TRANSFER-NEAR FIELD COMMUNICATION ENABLED COMMUNICATION DEVICE

(71) Applicant: Broadcom Corporation, Irvine, CA (US)

(72) Inventor: Aaron Smith, Wokingham (GB)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/657,338

(22) Filed: Mar. 13, 2015

(65) Prior Publication Data

US 2015/0188610 A1    Jul. 2, 2015

Related U.S. Application Data

(63) Continuation of application No. 13/730,760, filed on Dec. 28, 2012, now Pat. No. 9,031,502.

(60) Provisional application No. 61/727,642, filed on Nov. 16, 2012.

(51) Int. Cl.
H04B 5/00       (2006.01)
H04B 5/02       (2006.01)

(52) U.S. Cl.
CPC ............ H04B 5/0037 (2013.01); H04B 5/0031 (2013.01); H04B 5/0075 (2013.01); H04B 5/0062 (2013.01); H04B 5/02 (2013.01)

(58) Field of Classification Search
CPC ............ H04B 5/00; H04B 5/02; H04B 5/031; H04B 5/062; H04B 5/075; H04B 12/00
USPC ............... 455/39, 41.1, 41.2, 41.3, 67.11, 91, 455/106, 345
See application file for complete search history.

(56) References Cited

U.S. PATENT DOCUMENTS 7,280,045 B2    10/2007  Saarisalo et al.
7,643,463 B1     1/2010  Linsky et al.

(Continued)

FOREIGN PATENT DOCUMENTS

CN       101171758 A      4/2008
CN       102668408 A      9/2012
WO    WO 2012/140169 A1  10/2012

OTHER PUBLICATIONS

The NCF Forum, NFC Controller Interface Specification-Technical Specification NCI 1.0, Nov. 6, 2012.

(Continued)

Primary Examiner — Thanh Le
(74) Attorney, Agent, or Firm — Sterne, Kessler, Goldstein & Fox P.L.L.C.

(57) ABSTRACT

Various configurations and arrangements of various communication devices and antenna solutions are disclosed. Antenna solutions disclosed herein include a single inductive coupling element configured to resonate at a variety of resonant frequencies suitable for WPT and/or NFC communications. Resonant circuits can be provided for tuning the inductive coupling element to resonant at specific resonant frequency. The antenna solutions can be employed in WPT/NFC enabled communication devices capable of WPT and NFC communication.

20 Claims, 6 Drawing Sheets

(56) References Cited

U.S. PATENT DOCUMENTS

| | | | |
|---|---|---|---|
| 8,116,678 B2 * | 2/2012 | Johnson et al. | 455/41.1 |
| 8,126,433 B2 | 2/2012 | Haartsen | |
| 8,983,374 B2 * | 3/2015 | Wiley | 455/41.1 |
| 9,031,502 B2 | 5/2015 | Smith | |
| 2002/0140553 A1 | 10/2002 | Bachtiger et al. | |
| 2007/0141985 A1 | 6/2007 | Parkkinen et al. | |
| 2007/0218853 A1 | 9/2007 | Yu | |
| 2007/0222609 A1 | 9/2007 | Duron et al. | |
| 2008/0068133 A1 | 3/2008 | Hashimoto et al. | |
| 2008/0252420 A1 | 10/2008 | Scherabon | |
| 2009/0170559 A1 | 7/2009 | Phillips | |
| 2009/0189769 A1 | 7/2009 | Schaffler et al. | |
| 2010/0283586 A1 | 11/2010 | Ikeda et al. | |
| 2010/0302039 A1 | 12/2010 | Goto et al. | |
| 2010/0321166 A1 | 12/2010 | Horst et al. | |
| 2011/0084816 A1 | 4/2011 | Briese et al. | |
| 2011/0215921 A1 | 9/2011 | Ben Ayed et al. | |
| 2011/0248833 A1 | 10/2011 | Ritamaki | |
| 2011/0250926 A1 | 10/2011 | Wietfeld et al. | |
| 2011/0304434 A1 | 12/2011 | Kohli et al. | |
| 2011/0307305 A1 | 12/2011 | Kohli et al. | |
| 2012/0115553 A1 | 5/2012 | Mahe et al. | |
| 2013/0005252 A1 | 1/2013 | Lee et al. | |
| 2013/0189923 A1 | 7/2013 | Lewin | |
| 2013/0225127 A1 | 8/2013 | Cavacuiti et al. | |
| 2013/0247117 A1 | 9/2013 | Yamada et al. | |
| 2013/0260676 A1 | 10/2013 | Singh | |
| 2013/0281016 A1 | 10/2013 | McFarthing | |
| 2013/0309965 A1 | 11/2013 | Hillan | |
| 2014/0030986 A1 | 1/2014 | Caruana et al. | |
| 2014/0084060 A1 | 3/2014 | Jain et al. | |
| 2014/0141715 A1 | 5/2014 | Smith | |
| 2014/0148095 A1 | 5/2014 | Smith et al. | |
| 2014/0370804 A1 | 12/2014 | Dorning | |

OTHER PUBLICATIONS

Chinese Office Action dated Aug. 17, 2015, directed to related CN application No. 201310611694.8, from the State Intellectual Property Office of the P.R.C.; 5 pages.

* cited by examiner

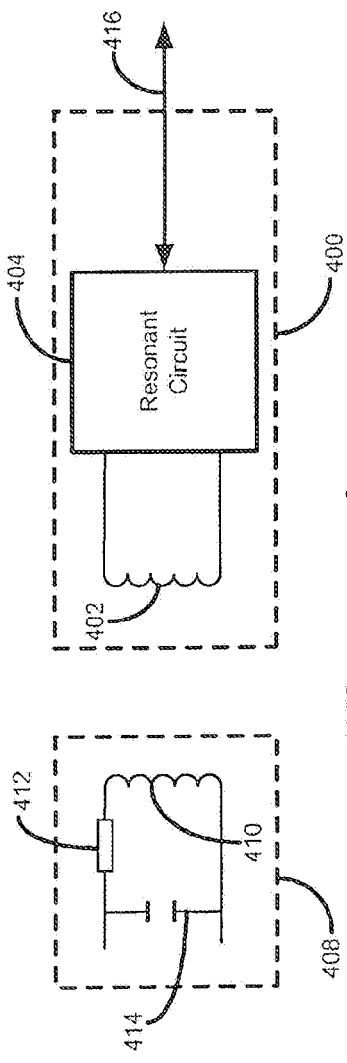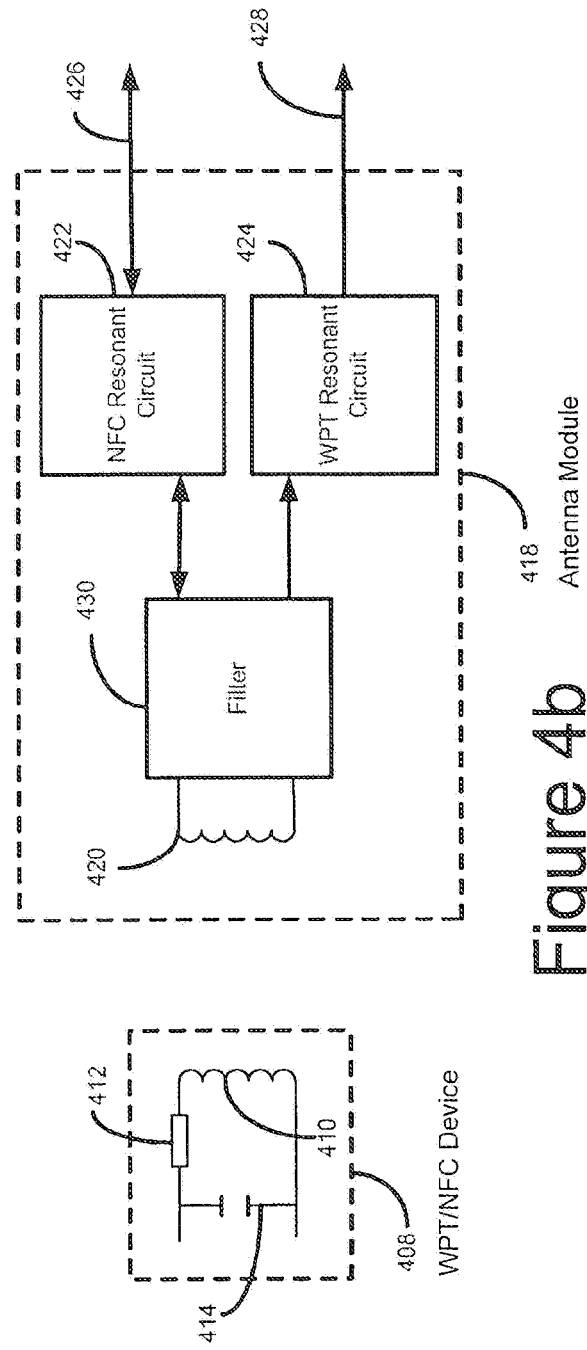

ANTENNA SOLUTION FOR WIRELESS POWER TRANSFER-NEAR FIELD COMMUNICATION ENABLED COMMUNICATION DEVICE

CROSS-REFERENCE TO RELATED APPLICATIONS

This patent application is a continuation of U.S. patent application Ser. No. 13/730,760, filed Dec. 28, 2012, now U.S. Pat. No. 9,031,502, which claims benefit to U.S. Patent Application No. 61/727,642 filed on Nov. 16, 2012. U.S. patent application Ser. No. 13/730,760 is incorporated herein by reference in its entirety.

TECHNICAL FIELD

The present disclosure relates generally to a single coil antenna solution for implementing both wireless power transfer (WPT) and near field communication (NFC) within the communication device.

BACKGROUND

Mobile wireless communication devices such as cellular telephones, two-way radios, personal digital assistants (PDAs), personal computers (PCs), tablet computers, laptop computers, home entertainment equipment, radio frequency (RF) identification (RFID) readers, RFID tags, etc. have evolved from large devices focused on a single application or use, such as analog voice communications, to comparatively smaller devices that are capable of and used for many different things such as digital voice communications and digital data communications, e.g., Short Message Service (SMS) for text messaging, email, packet switching for access to the Internet, gaming, Bluetooth®, Multimedia Messaging Service (MMS) and secure transaction capability to provide some examples. In addition to these capabilities, the mobile wireless communication devices of today have additional non-communication related capabilities, such audio and/or video recording to provide an example, and software applications, such as a calendar and a phone book, to provide some examples. In order to make recharging the power source in these mobile wireless communication devices easier, manufacturers have begun placing WPT capabilities in these mobile wireless communication devices to allow them to be recharged from an external wireless power source without the use of a wired connection.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DISCLOSURE

Figure 1:
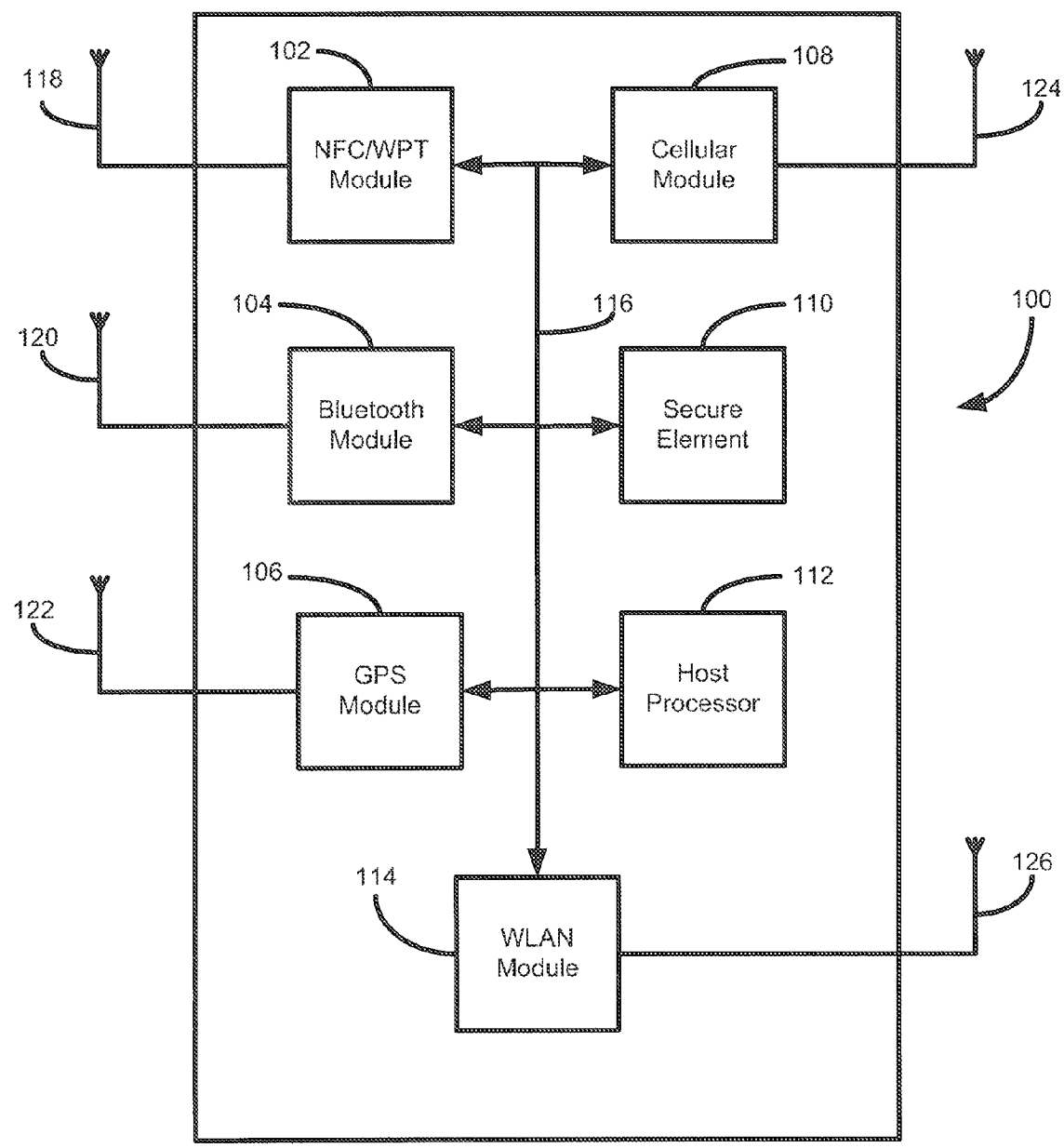
FIG. 1 illustrates a block diagram of a first exemplary WPT/NFC enabled communication device according to an exemplary embodiment of the present disclosure.

FIG. 1 illustrates a block diagram of one exemplary WPT/NFC enabled communication device according to an exemplary embodiment of the present disclosure. A WPT/NFC enabled communication device 100 may communicate information over wireless communication networks in accordance with various communication standards. The WPT/NFC enabled communication device 100 can represent a mobile communication device, such as a cellular phone or a smartphone, a mobile computing device, such as a tablet computer or a laptop computer, or any other electronic device that is capable of communicating information over communication networks that will be apparent to those skilled in the relevant art(s) without departing from the spirit and scope of the present disclosure.

The WPT/NFC enabled communication device 100 can include a NFC/WPT module 102, a Bluetooth® Module 104, a Global Position System (GPS) module 106, a cellular module 108, a secure element 110, a host processor 112, a wireless local area network (WLAN) module 114, or any combination thereof which are communicatively coupled to one another via a communication interface 116. The WPT/NFC enabled communication device 100 can also include an NFC/WPT antenna 118, a Bluetooth® antenna 120, a GPS antenna 122, a cellular antenna 124, and a WLAN antenna 126. It should be noted that the WPT/NFC enabled communication device 100 need not include all of: the NFC/WPT module 102, the Bluetooth® Module 104, the GPS module 106, the cellular module 108, the secure element 110, the host processor 112, the WLAN module 114, communication interface 116, the NFC/WPT antenna 118, the Bluetooth® antenna 120, the GPS antenna 122, the cellular antenna 124, and/or the WLAN antenna 126. Those skilled in the relevant art(s) will recognize that other configurations and arrangements of the WPT/NFC enabled communication device 100 are possible without departing from the spirit and scope of the present disclosure. Additionally, those skilled in the relevant art(s) will also recognize that the NFC/WPT module 102, the Bluetooth® Module 104, the GPS module 106, the cellular module 108, the secure element 110, the host processor 112, and/or the WLAN module 114 need not necessarily be communicatively coupled to one another via the communication interface 116. In these situations, those modules that are communicatively coupled to the communication interface 116 can independently communicate with other communication enabled devices without internal communication.

The NFC/WPT module 102 can be configured to provide wireless communications between the WPT/NFC enabled communication device 100 and another NFC capable device in accordance with various NFC standards. The NFC/WPT module 102 can be configured to operate in an initiator or reader mode of operation to initiate communications with another NFC capable device, or in a target or tag mode of operation to receive communications from another NFC capable device. Additionally, the NFC/WPT module 102 may derive or harvest power from communications received from this other NFC capable device when operating in the tag mode of operation. The power derived or harvested from the received communications can sometimes be adequate to operate the NFC/WPT module 102 and/or the secure element 110.

Additionally, the NFC/WPT module 102 can be configured to support WPT from a wireless power transmitter, the NFC controller or another similar electronic device that emits a magnetic field. The NFC/WPT module 102 may derive or harvest power from a received WPT signal, such as a magnetic resonance that is provided by the wireless power transmitter. This power that is derived or harvested from the received WPT signal can sometimes be adequate to operate at least the NFC/WPT module 102, and/or the device battery and/or the secure element 110.

As explained in more detail below, the NFC/WPT module 102 communicates with other NFC/WPT enabled devices through the NFC/WPT antenna 118. In some embodiments, NFC and WPT may be accomplished at different frequencies which may coexist. For example, Near Field Communications may be conducted at 13.56 MHz while Wire Power Transfer may be conducted, in the 100-250 kHz range or at 6.7 MHz. In various embodiments, the NFC/WPT antenna 118 can be configured as a single coil designed to resonate at both the NFC frequency and the WPT frequency.

The Bluetooth® Module 104 can be configured to provide wireless communications between the WPT/NFC enabled communication device 100 and another Bluetooth® capable device through the Bluetooth® antenna 120 in accordance with various Bluetooth® or Bluetooth® Low Energy (BLE) standards. The Bluetooth® Module 104 can be configured to operate in a master mode of operation to initiate communications with another Bluetooth® capable device or in a slave mode of operation to receive communications from another Bluetooth® capable device.

The GPS Module 106 can be configured to receive various signals from various satellites through the GPS antenna 122, and to calculate a position of the WPT/NFC enabled communication device 100 based on the received signals. The GPS Module 106 may be implemented using a Global Navigation Satellite System (GNSS) receiver which can be configured to use the GPS, GLONASS, Galileo and/or Beidou systems for calculating the position of the WPT/NFC enabled communication device 100.

The cellular module 108 can be configured to provide wireless communication through the cellular antenna 124 between the WPT/NFC enabled communication device 100 and another cellular capable device over a cellular network in accordance with various cellular communication standards such as a Generation Partnership Project (3GPP) Long Term Evolution (LTE) communications standard, a fourth generation (4G) mobile communications standard, or a third generation (3G) mobile communications standard to provide some examples. The cellular module 108 may communicate with one or more transceivers, referred to as base stations or access points, within the cellular network to provide voice and/or data communications between the WPT/NFC enabled communication device 100 and another cellular capable device. The transceivers may be connected to a cellular telephone exchange that connects to a public telephone network or to another cellular telephone exchange within the cellular network.

The secure element 110 can be configured to securely store applications and/or information such as payment information, authentication information, ticketing information, and/or marketing information to provide some examples, within the WPT/NFC enabled communication device 100, and to provide for an environment for secure execution of these applications. The secure element 110 can be implemented as a separate secure smart card chip, in, among other things, a subscriber identity module (SIM)/Universal Integrated Circuit Card (UICC), or a secure digital (SD) card that can be inserted in the WPT/NFC enabled communication device 100.

The host processor 112 can be configured to control overall operation and/or configuration of the WPT/NFC enabled communication device 100. The host processor 112 may receive information from, among other things, a user interface such as a touch-screen display, an alphanumeric keypad, a microphone, a mouse, a speaker, and/or from other electrical devices or host devices that are coupled to the WPT/NFC enabled communication device 100. The host processor 112 can be configured to provide this information to the NFC/WPT module 102, the Bluetooth® Module 104, the GPS module 106, the cellular module 108, the secure element 110, and/or the WLAN module 114. Additionally, the host processor 112 can be configured to receive information from the NFC/WPT module 102, the Bluetooth® Module 104, the Global Position System (GPS) module 106, the cellular module 108, the secure element 110, and/or the WLAN module 114. The host processor 112 may provide this information to the user interface, to other electrical devices or host devices, and/or to the NFC/WPT module 102, the Bluetooth® Module 104, the GPS module 106, the cellular module 108, the secure element 110, and/or the WLAN module 114 via the communication interface 116. Further, the host processor 112 can be configured to execute one or more applications such as SMS for text messaging, electronic mailing, and/or audio and/or video recording to provide some examples, and/or software applications such as a calendar and/or a phone book to provide some examples.

The WLAN module 114 can be configured to provide wireless communications between the WPT/NFC enabled communication device 100 and another WLAN capable device over a wired communication network and/or via the WLAN antenna 126 to a wireless communication network in accordance with various networking protocols such a Worldwide Interoperability for Microwave Access (WiMAX) communications standard or a WiFi™ communications standard to provide some examples. The WLAN module 114 can operate as an access point to provide communications between other WLAN capable devices and a communication network, or as a client to communicate with another access point, such as a wireless router to provide an example, to access the communication network.

The communication interface 116 can be configured to route various communications between the NFC/WPT module 102, the Bluetooth® Module 104, the GPS module 106, the cellular module 108, the secure element 110, the host processor 112, and/or the WLAN module 114. These communications can include various digital signals, such as one or more commands and/or data to provide some examples, various analog signals, such as direct current (DC) currents and/or voltages to provide some examples, or any combination thereof. The communication interface 116, as well as other communication interfaces that are discussed below, can be implemented as a series of wireless interconnections between the NFC/WPT module 102, the Bluetooth® Module 104, the GPS module 106, the cellular module 108, the secure element 110, the host processor 112, and/or the WLAN module 114. The interconnections of the communication interface 116, as well as interconnections of other communication interfaces that are discussed below, can be arranged to form a parallel architecture interface to carry communications between various modules of the WPT/NFC enabled communication device 100 in parallel using multiple conductors, a resonant interface to carry communications between various modules of the WPT/NFC enabled communication device 100 using a single conductor, or any combination thereof. A WPT/NFC enabled communication device, such as the WPT/NFC enabled communication device 100 to provide an example, may include one or more integrated circuits that can be configured and arranged to form one or more modules, such as the NFC/WPT module 102, the Bluetooth® Module 104, the GPS module 106, the cellular module 108, the secure element 110, the host processor 112, and/or the WLAN module 114 to provide some examples.

Figure 2:
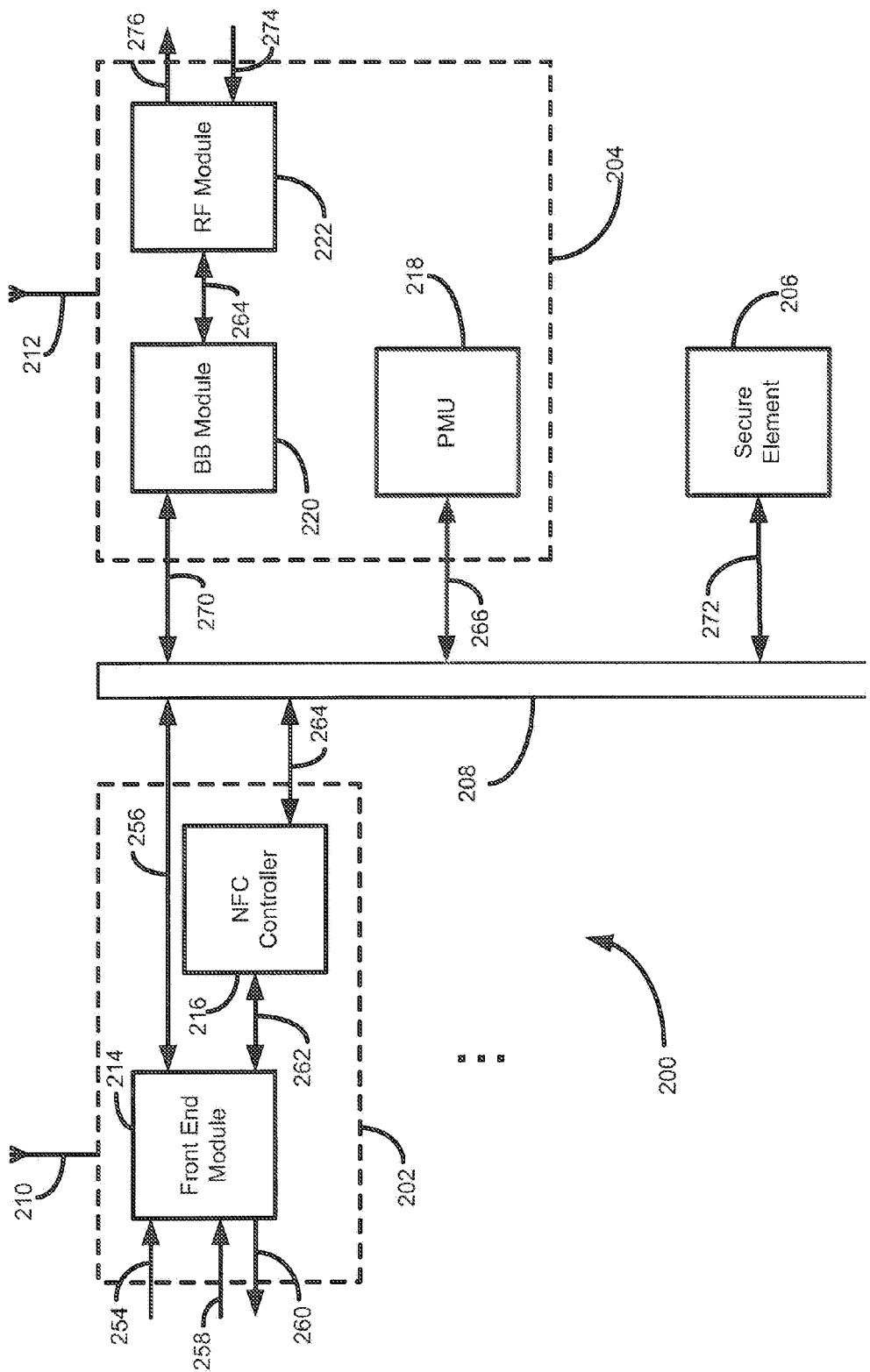
FIG. 2 further illustrates the block diagram of the first exemplary WPT/NFC enabled communication device according to an exemplary embodiment of the present disclosure.

FIG. 2 further illustrates a block diagram of an exemplary WPT/NFC enabled communication device according to an exemplary embodiment of the present disclosure. A WPT/NFC enabled communication device 200 can include one or more integrated circuits that can be configured and arranged to form one or more modules that are used to communicate information over wireless communication networks in accordance with various communication standards. The WPT/NFC enabled communication device 200 may include an NFC/WPT module 202, a cellular module 204, and a secure element 206 which can be communicatively coupled to one another via a communication interface 208. An NFC/WPT antenna 210 can be connected to the NFC/WPT module 202 and a cellular antenna 212 can be connected to the cellular module 204. The WPT/NFC enabled communication device 200 can represent another exemplary embodiment of the WPT/NFC enabled communication device 100 of FIG. 1. As such, the NFC/WPT module 202, the cellular module 204, the secure element 206, and the communication interface 208 can represent an exemplary embodiment of the NFC/WPT module 102, the cellular module 108, the secure element 110, and the communication interface 116, respectively. Additionally, the WPT/NFC enabled communication device 200 may further include a Bluetooth® Module, a GPS module, a host processor, and/or a WLAN module such as the Bluetooth® Module 104, the GPS module 106, the host processor 112, and/or the WLAN module 114, respectively, of FIG. 1. The Bluetooth® Module, the GPS module, the host processor, and/or the WLAN module may be communicatively coupled to the NFC/WPT module 202, the cellular module 204, and/or the secure element 206 via the communication interface 208.

The NFC/WPT module 202 can be configured to provide wireless communications between the WPT/NFC enabled communication device 200 and another NFC capable device in accordance with various NFC standards in the reader or in the tag mode of operations, as well as WPT from a wireless power transmitter in a substantially similar manner as the NFC/WPT module 102. The NFC/WPT module 202 can include a front end module (FEM) 214 and/or an NFC controller 216. In one embodiment, the FEM 214 can be configured as an RF front end, such as, for example, an analog high voltage system possibly based on a generally larger gate process, in conjunction with a digital back-end, such as, for example, a low voltage system possibly based on a generally small gate process.

FEM 214 can be configured to provide an interface between the NFC/WPT module 202 and another NFC capable device and/or the wireless power transmitter. The front end module 214 can receive a WPT signal 254 from the wireless power transmitter through the NFC/WPT antenna 210. The FEM 214 can be configured to derive or harvest power from a received WPT signal 254, and provide harvested WPT power to a front end module communication interface (FEM-CI) 256 for routing to the NFC/WPT module 202, the cellular module 204, the secure element 206 and/or other modules within the WPT/NFC enabled communication device 200 via the communications interface 208. In an exemplary embodiment, the communication interface 208 can be configured to route the harvested WPT power from the FEM-CI 256 to a power management unit (PMU) 218 of the cellular module 204.

Additionally, when the NFC/WPT module 202 is operating in the reader mode of operation, the FEM 214 can be configured to generate a magnetic field, sometimes referred to as a transmitted NFC communication signal 260, which can be modulated by another NFC capable device with information to form an NFC communication signal 258 that may be received by the FEM 214/NFC/WPT module 202. The FEM 214 can also modulate the magnetic field with information, such as data and/or one or more commands, that is received from a front end module controller (FEM-CTRLR) communication interface 262 to form the transmitted NFC communication signal 260 when the NFC/WPT module 202 is operating in the reader mode of operation. Alternatively, when the NFC/WPT module 202 is operating in the tag mode of operation, the FEM 214 can be configured to inductively receive an NFC communication signal 260 which may represent a magnetic field generated by another NFC capable device that can be modulated with information. The FEM 214 can also modulate the magnetic field with information, such as data and/or one or more commands, that is received from a FEM-CTRLR communication interface 262 to form the transmitted NFC communication signal 260 when the NFC/WPT module 202 is operating in the tag mode of operation. The FEM 214 can be configured to derive or harvest power from the received NFC communication signal 260 and provide the harvested NFC power to the NFC controller 216 via the FEM-CTRLR communication interface 262.

The FEM 214 can be configured to recover and then provides information from the received NFC communication signal 256 to the NFC controller 216 via the FEM-CTRLR communication interface 262 when the NFC/WPT module 202 is operating in the reader and tag modes of operation. Specifically, the FEM 214 may convert its own magnetic field when the NFC/WPT module 202 is operating in the reader mode of operation or the magnetic field generated by another NFC capable device when the NFC/WPT module 202 is operating in the tag mode of operation into a voltage and/or a current, and recover the information from the voltage and/or the current.

The NFC controller 216 can control overall operation and/or configuration of the NFC/WPT module 202. The NFC controller 216 can be configured to receive information and/or the harvested NFC power from the FEM 214 via the FEM-CTRLR communication interface 262. Additionally, the NFC controller 216 can route the information and/or the harvested NFC power from the FEM-CTRLR communication interface 262 to a controller communication interface (CTRLR-CI) 264 for routing to the NFC/WPT module 202, the cellular module 204, the secure element 206, and/or other modules within the WPT/NFC enabled communication device 200 via the communication interface 208. Further, the NFC controller 216 can receive information from the NFC/WPT module 202, the cellular module 204, the secure element 206, and/or other modules within the WPT/NFC enabled communication device 200 via the CTRLR-CI 264. The NFC controller 216 can route the information received from the CTRLR-CI 264 to the FEM 214 via the FEM-CTRLR communication interface 262. Further, the NFC controller 216 can execute one or more commands provided by the information from the FEM- CTRLR communication interface 262 and/or the CTRLR-CI 264 to control overall operation and/or configuration of the NFC/WPT module 202.

The cellular module 204 can be configured to provide wireless communication between the WPT/NFC enabled communication device 200 and another cellular capable device over a cellular network in accordance with various cellular communication standards in a substantially similar manner as the cellular module 108. The cellular module 204 can include the PMU 218, a baseband module 220, a radio frequency module 222 and a cellular antenna 212.

The PMU 218 may be configured to take responsibly for battery and power system management of the cellular module 204 and/or the WPT/NFC enabled communication device 200. The PMU 218 can be configured to receive various power signals from the NFC/WPT module 202, the cellular module 204, the secure element 206, and/or other modules within the WPT/NFC enabled communication device 200 from the communication interface 208 via a PMU-CI communication interface 266. In one exemplary embodiment, the PMU 218 can be configured to receive the harvested WPT power from the NFC/WPT module 202 via the PMU-CI communication interface 266. In this exemplary embodiment, the PMU 218 can use the harvested WPT power to form various power signals and route these various power signals to the PMU-CI communication interface 266 to provide power to the NFC/WPT module 202, the secure element 206, and/or other modules within the WPT/NFC enabled communication device 200 via the communication interface 208. The PMU 218 can also be configured to monitor the power signals received from the PMU-CI communication interface 266 to monitor current, voltages, and/or temperature readings within the WPT/NFC enabled communication device 200. Additionally, the PMU 218 can be configured to use the power signals received from the PMU-CI communication interface 266 to monitor power connections and battery charges and/or to charge batteries when necessary. Further, the PMU 218 can be configured to use the power signals received from the PMU-CI communication interface 266 to control and/or to provide other power signals to the PMU-CI communication interface 266 to provide power to the NFC/WPT module 202, the secure element 206, and/or other modules within the WPT/NFC enabled communication device 200 via the communication interface 208.

The baseband module 220 can be configured to control operation of the cellular module 204. The baseband module 220 may receive information from the RF module 222 via a broadband-radio frequency module (BB-RFM) communication interface 264. Additionally, the baseband module 220 can be configured to provide the information from the BB-RFM communication interface 264 to a baseband communication interface (BB-CI) 270 for routing to the NFC/WPT module 202, the secure element 206, and/or other modules within the WPT/NFC enabled communication device 200 via the communication interface 208. Further, the baseband module 220 can be configured to receive information from the NFC/WPT module 202, the secure element 206, and/or other modules within the WPT/NFC enabled communication device 200 from the communications interface 208 via the BB-CI 270. The baseband module 220 can route the information received from the BB-CI 270 to the RF module 222 via the BB-RFM communication interface 26. Further, the baseband module 220 can be configured to execute one or more commands provided by the information from the BB-RFM communication interface 264 and/or the BB-CI 270 to control overall operation and/or configuration of the cellular module 204.

The RF module 222 can be configured to downconvert, demodulate, and/or decode a received cellular communication signal 274 to provide information to the baseband module 220 via the BB-RFM communication interface 264. The RF module 222 can convert the received cellular communication signal 274 from an analog representation to a digital representation. The RF module 222 can also be configured to upconvert, modulate, and/or encode information received from the baseband module 220 via the BB-RFM communication interface 264 to provide a transmitted cellular communication signal 276. The RF module 222 can also convert the information received from the BB-RFM communication interface 264 from a digital representation to an analog representation.

The secure element 206 can be configured to securely store applications and/or information within the WPT/NFC enabled communication device 200 and provide for an environment for secure execution of these applications in a substantially similar manner as the secure element 110. The secure element 206 can also be configured to receive the applications and/or the information from the NFC/WPT module 202, the cellular module 204, and/or other modules within the WPT/NFC enabled communication device 200 from the communication interface 208 via a Secure Element communications interface (SE-CI) 272. The secure element 206 can provide the information and/or other information generated by the applications to the SE-CI 272 for routing onto the NFC/WPT module 202, the cellular module 204, and/or other modules within the WPT/NFC enabled communication device 200 via the communication interface 208.

Figure 3:
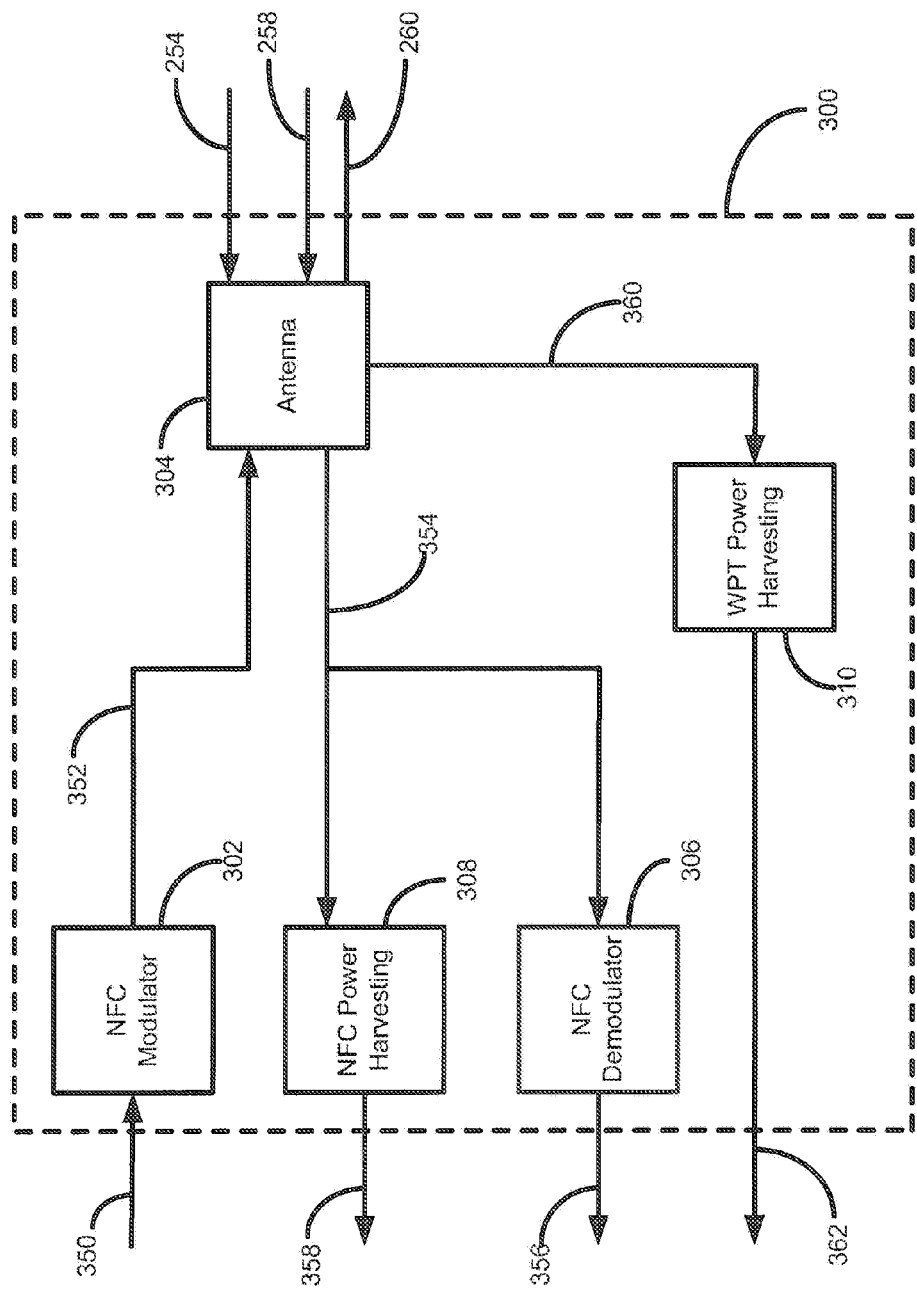
FIG. 3 illustrates an exemplary front end module that can be implemented within the first exemplary WPT/NFC enabled communication device according to an exemplary embodiment of the present disclosure.

FIG. 3 illustrates one exemplary FEM that can be implemented within an exemplary WPT/NFC enabled communication device according to exemplary embodiments of the present disclosure. An FEM 300 can be configured to provide an interface between a WPT/NFC enabled communication device, such as the WPT/NFC enabled communication device 100 or the WPT/NFC enabled communication device 200 to provide some examples, and an NFC capable device and/or a wireless power transmitter. The FEM 300 can be configured to inductively receive various signals from the NFC capable device and/or the wireless power transmitter, and recover information and various power signals from these various signals. The FEM 300 can include an NFC modulator module 302, an antenna module 304, an NFC demodulator module 306, an NFC power harvesting module 308, and a WPT power harvesting module 310. The FEM 300 can also represent an exemplary embodiment of FEM 214.

The NFC modulator module 302 can be configured to modulate transmission information 350 onto a carrier wave, such as an RF carrier wave using any suitable analog or digital modulation technique to provide a modulated information signal 352 when the WPT/NFC enabled communication device is operating in the reader mode of operation. One commonly used carrier wave frequency for NFC applications is 13.56 MHz, however, other frequencies can be used without departing from the spirit and scope of the present disclosure. Suitable analog or digital modulation techniques may include, among others, amplitude modulation (AM), frequency modulation (FM), phase modulation (PM), phase shift keying (PSK), frequency shift keying (FSK), amplitude shift keying (ASK), quadrature amplitude modulation (QAM) and/or any other suitable modulation technique that will be apparent to those skilled in the relevant art(s). The transmission information 350 can be received from other modules of the WPT/NFC enabled communication device over a communication interface, such as the FEM-CTRLR communication interface 262 to provide an example. In some situations, the NFC modulator module 302 can simply provide the carrier wave as the modulated information signal 352. Additionally, the NFC modulator module 302 can be configured to modulate the transmission information 350 using the suitable analog or digital modulation technique to provide the modulated information signal 352 when the WPT/NFC enabled communication device is operating in the tag mode of operation.

The antenna module 304 can be configured to inductively receive the WPT signal 254 from the wireless power transmitter to provide a recovered WPT signal 360 and/or the received NFC communication signal 258 from another NFC capable device to provide a recovered NFC communication signal 354. As described in more detail below, in various exemplary embodiments, the antenna module 304 can comprise a single inductive coupling element such as a coil that can be tuned by a resonant tuned circuit to resonate at a first frequency which is suitable for receiving a WPT signal 254 and tuned by the resonant tuned circuit to resonate at a second frequency which is suitable for receiving an NFC communication signal 258. For example, the resonant frequency could be between approximately 100 kHz and 250 kHz or at 6.7 MHz to receive the received WPT signal 254 and the second resonant frequency could be approximately 13.56 MHz to receive the received NFC communication signal 258.

Additionally, the antenna module 304 can be configured to provide the transmitted NFC communication signal 260 based upon the modulated information signal 352. When the WPT/NFC enabled communication device is operating in the reader mode of operation, the antenna module 304 can apply the modulated information signal 352 to the single inductive coupling element to generate a magnetic field that represents the transmitted NFC communication signal 260. Alternatively, the antenna module 304 can apply the modulated information signal 352 to the single inductive coupling element to modulate a magnetic field that is inductively coupled the single inductive coupling element with the modulated information signal 352 to provide the transmitted NFC communication signal 260.

The NFC demodulator module 306 can be configured to demodulate the recovered NFC communication signal 354 to extract a recovered information signal 356 that was modulated using any suitable analog or digital modulation technique. The suitable analog or digital modulation technique may include, among others, amplitude modulation (AM), frequency modulation (FM), phase modulation (PM), phase shift keying (PSK), frequency shift keying (FSK), amplitude shift keying (ASK), quadrature amplitude modulation (QAM) and/or any other suitable modulation technique that will be apparent to those skilled in the relevant art(s). The recovered information signal 356 can be provided to other modules of the WPT/NFC enabled communication device over a communication interface, such as the FEM-CTRLR communication interface 262 to provide an example.

The NFC power harvesting module 308 can be configured to derive or harvest power from the recovered NFC communication signal 354 to provide a harvested NFC power 358. In an exemplary embodiment, the NFC power harvesting module 308 can include a rectifier to rectify the recovered NFC communication signal 354 to provide rectified NFC power. In one exemplary embodiment, the NFC power harvesting module 308 can additionally include a regulator to regulate the rectified NFC power to provide the harvested NFC power 358. In some situations, the harvested NFC power 358 can be provided to other modules of the WPT/NFC enabled communication device over a communication interface, such as the FEM-CTRLR communication interface 262 to provide an example.

The WPT power harvesting module 310 can be configured to derive or harvest power from the recovered WPT signal 360 to provide harvested WPT power 362. In one exemplary embodiment, the WPT power harvesting module 310 can include a rectifier to rectify the recovered WPT signal 360 to provide rectified WPT power. In one exemplary embodiment, the WPT power harvesting module 310 can additionally include a regulator to regulate the rectified WPT power to provide the harvested WPT power 362. In some situations, the harvested WPT power 362 can be provided to other modules of the WPT/NFC enabled communication device over a communication interface, such as the FEM-CI communication interface 256 to provide an example.

WPT and NFC communications work generally on the principle of resonant inductive coupling. Resonant inductive coupling is the near field wireless transmission of electrical energy between two coils that are tuned to resonate at the same or very similar frequency. In practice, a WPT/NFC enabled device can act as a WPT/NFC transmitter by applying an oscillating current to a coil to create an oscillating magnetic field. Another WPT/NFC enabled device having a coil resonating at the same or similar frequency as the oscillating magnetic field that is placed in the oscillating magnetic field near the WPT/NFC transmitter can couple with the WPT/NFC transmitter picking up energy and/or information from the oscillating magnetic field. Typically WPT and NFC operate at different resonant frequencies, although in some instances, WPT and NRC resonant frequencies can coexist. In one exemplary embodiment, WPT communications operate at 100-250 kHz or 6.7 MHz while NFC communications operate at 13.56 MHz.

FIG. 4a illustrates an exemplary antenna module 400 that can be implemented within an exemplary WPT/NFC enabled communication device (such as WPT/NFC enabled communication devices 100 and/or 200) according to exemplary embodiments of the present disclosure. The antenna module 400 can include a single inductive coupling element 402 and a resonant circuit 404. The resonant circuit 404 can be configured to tune the single inductive coupling element 402 to resonate at two or more distinct frequencies, one suitable for WPT communication and another suitable for NFC communication. For example, the resonant circuit 404 could be configured to tune the single inductive coupling element 402 to resonate at 100-250 kHz or 6.7 MHz for WPT communications and 13.56 MHz for NFC communications. In one, exemplary embodiment, the single inductive coupling element 402 may comprise a coil.

In this embodiment, the WPT/NFC enabled communication device can be configured to communicate with another WPT and/or NFC enabled device through resonant inductive coupling. For example, WPT and/or NFC enabled communication device 408 can be configured as a transmitter/receiver having an inductive coupling element 410 tuned to resonate at a predetermined frequency. In one exemplary embodiment, the inductive coupling element 410 can be capacitively loaded with a resistance 412 and capacitance 414 so as to form a tuned resonant circuit. When current is applied to the inductive coupling element 410, an oscillating magnetic field indicative of a WPT and/or NFC communication signal can be created at a carrier frequency determined by the tuned resonant circuit. In sample embodiments, the tuned resonant circuit can be configured to create a communication signal with a resonant frequency suitable for WPT and/or NFC such as 100-250 kHz, 6.7 MHz and/or approximately 13.56 MHz, for example.

The antenna module 400 can be configured to receive the communication signal from the WPT and/or NFC enabled communication device 408 by tuning the inductive coupling element 402 to the resonant frequency of the WPT and/or NFC enabled communication device 408 and placing the inductive coupling element 402 near the inductive coupling element 410 in the oscillating magnetic field. A current indicative of the WPT and/or NFC communication signal generated by WPT and/or NFC enabled communication device 408 will be induced in inductive coupling element 402 when it is placed in the oscillating magnetic field near the inductive coupling element 410 and tuned to the resonant frequency of the oscillating magnetic field by the resonant circuit 404. The WPT and/or NFC communication signal can be received by the antenna module 400 in the form of this induced current, and the received communication signal 416 can be passed along to an NFC/WPT module (such as NFC/WPT module 102) for processing.

The resonant circuit 404 can be configured to tune inductive coupling element 402 to the same or similar frequency as the resonant frequency of the oscillating magnetic field. Resonant circuit 404 can be configured to tune the single inductive coupling element 402 to any one of multiple frequencies suitable for receiving and/or transmitting WPT and/or NFC communications. In one exemplary embodiment, resonant circuit 404 can be configured to switch the resonant frequency of inductive coupling element 402 between various WPT and/or NFC frequencies until an oscillating magnetic field of matching resonant frequency is found and then maintaining the matched resonant frequency long enough to receive a communication message. In another exemplary embodiment, resonant circuit 404 can be configured to sense the presence of an oscillating magnetic field, determine the resonant frequency of the oscillating magnetic field, and tune inductive coupling element 402 to the resonant frequency of the oscillating magnetic field long enough to receive a communication message.

Additionally, the antenna module 400 can be configured operate in a transmit mode to provide a transmitted NFC communication signal. In transmit mode, resonant circuit 404 can be configured to receive an NFC communication signal 416 from the NFC/WPT module (such as NFC/WPT module 102) and tune the inductive coupling element 402 to produce an oscillating magnetic field that resonates at a predetermined resonance frequency which can be used to transmit the NFC communication signal to another NFC enabled device. In this exemplary embodiment, WPT and/or NFC enabled communication device 408 may operate as an NFC receiver. In this exemplary embodiment, inductive coupling element 410 of the WPT and/or NFC enabled communication device 408 may, when placed in proximity to inductive coupling element 402 in the oscillating magnetic field and tuned to the resonant frequency of the oscillating magnetic field, produce an induced current indicative of the NFC communication signal transmitted by the antenna module 400.

Figure 4C:
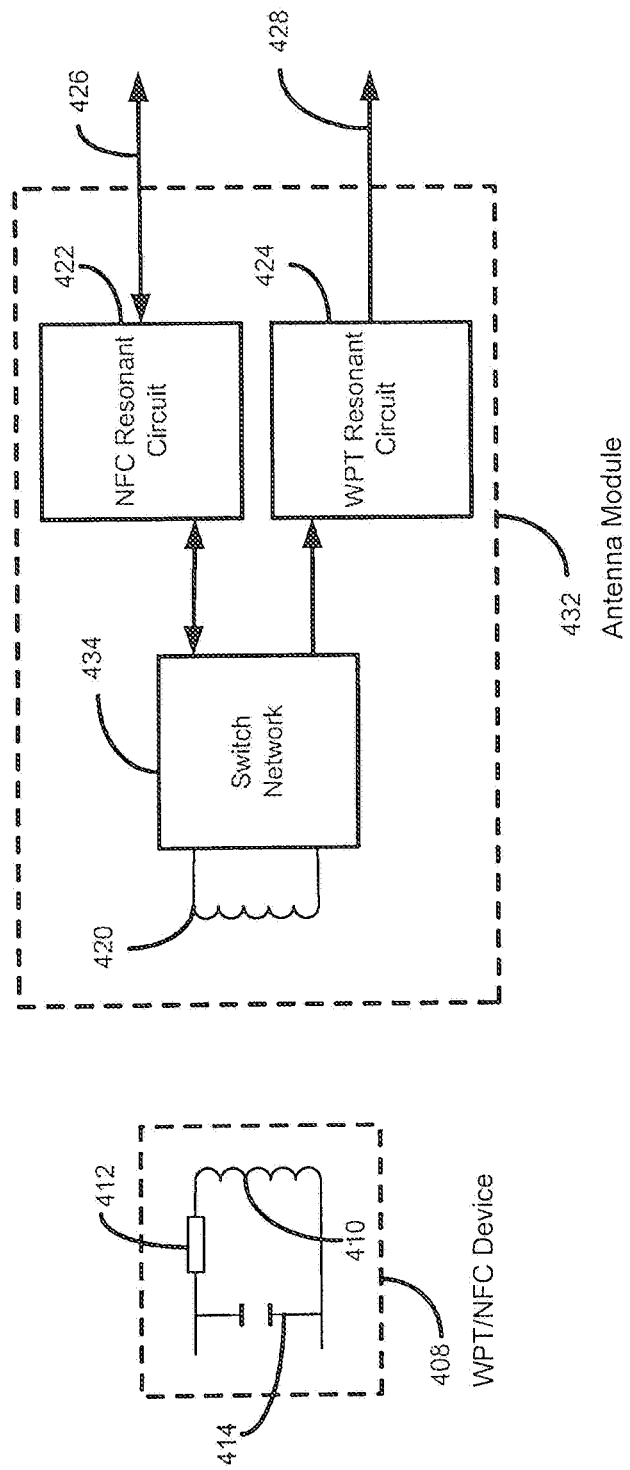
FIGS. 4a, b, and c illustrate exemplary schematic representations of a single inductive coupling element antenna for implementing WPT and NFC in accordance with various embodiments.

FIGS. 4b and 4c illustrate other exemplary antenna modules 418 and 432 that can be implemented within an exemplary WPT/NFC enabled communication device (such as devices 100 and/or 200) according to exemplary embodiments of the present disclosure. In these exemplary embodiments, the antenna modules 418 and 432 can include a single inductive coupling element 420, an NFC resonant circuit 422, and a WPT resonant circuit 424. NFC resonant circuit 422 can be configured to tune the single inductive coupling element 420 to resonate at a frequency suitable for NFC communications, for example 13.56 MHz, and WPT resonant circuit 424 can be configured to tune the single inductive coupling element 420 to resonate at a frequency for WPT communication, for example 100-250 kHz. In one, exemplary embodiment, single inductive coupling element 420 may comprise a coil.

In these embodiments, the WPT/NFC enabled communication device can be configured to communicate with another WPT and/or NFC enabled device through resonant inductive coupling. For example, WPT and/or NFC enabled communication device 408 can be configured as a transmitter having an inductive coupling element 410 tuned to resonate at a predetermined frequency. In one exemplary embodiment, inductive coupling element 410 can be capacitively loaded with a resistance 412 and capacitance 414 so as to form a tuned resonant circuit. When current is applied to the inductive coupling element 410, an oscillating magnetic field indicative of a WPT and/or NFC communication signal can be created at a carrier frequency determined by the tuned resonant circuit. In sample embodiments, the tuned resonant circuit can be configured to create a communication signal with a resonant frequency suitable for WPT and/or NFC such as 100-250 kHz, 6.7 MHz and/or approximately 13.56 MHz, for example.

Antenna modules 418 and 432 can be configured to receive the communication signal from device 408 by tuning single inductive coupling element 420 to the resonant frequency of device 408 and placing the single inductive coupling element 420 near inductive coupling element 410 in the oscillating magnetic field. A current indicative of the WPT and/or NFC communication signal generated by WPT and/or NFC enabled communication device 408 will be induced in inductive coupling element 420 when it is placed in the oscillating magnetic field near inductive coupling element 410 and tuned to the resonant frequency of the oscillating magnetic field by the resonant circuit 404. The WPT and/or NFC communication signal can be received by the antenna module 418 in the form of this induced current and the received communication signal 426 or 428 can be passed along to an NFC/WPT module (such as NFC/WPT module 102) for processing.

The NFC resonant circuit 422 can be configured to tune inductive coupling element 420 to a frequency suitable for NFC communication and the WPT resonant circuit 424 can be configured to tune single inductive coupling element 420 to a frequency suitable for WPT communication. If WPT and/or NFC communication device 408 produces a WPT communication signal in the oscillating magnetic field at a frequency suitable for WPT communication, WPT resonant circuit 424 of antenna module 418 or 432 can tune the single inductive coupling element 420 to the same or similar frequency as the resonant frequency of the oscillating magnetic field so that a current indicative of the WPT communication signal is induced in single inductive coupling element 420 when it is placed in proximity to inductive coupling element 410 in the oscillating magnetic field. In this way, the WPT communication signal can be received by antenna module 418 or 432 in the form of this induced current and the received WPT communication signal 428 can be passed along to the NFC/WPT module (such as NFC/WPT module 102). If WPT and/or NFC communication device 408 produces an NFC communication signal in oscillating magnetic field at a frequency suitable for NFC communication, NFC resonant circuit 422 of antenna module 418 or 432 can tune single inductive coupling element 420 to the same or similar frequency as the resonant frequency of the oscillating magnetic field so that a current indicative of the NFC communication signal is induced in single inductive coupling element 420 when it is placed in proximity to inductive coupling element 410 in the oscillating magnetic field. In this way, the NFC communication signal can be received by antenna module 418 or 432 in the form of this induced current and the received NFC communication signal 426 can be passed along to the NFC/WPT module (such as NFC/WPT module 102).

In one exemplary embodiment, antenna module 418 can include a filter 430 to sense the presence of an oscillating magnetic field, determine the resonant frequency of the oscillating magnetic field, and signal either the NFC resonant circuit 422 or the WPT resonant circuit 424 to tune inductive coupling element 420 to the resonant frequency of the oscillating magnetic field long enough to receive a communication message. In another exemplary embodiment, antenna module 432 can include a switch network 434 which can be configured to switch between the NFC resonant circuit 422 and the WPT resonant circuit 424 such that the resonant frequency of inductive coupling element 420 is switched between various WPT and/or NFC frequencies until an oscillating magnetic field of matching resonant frequency is found. The switch network 434 can be configured to then maintain the matched resonant frequency long enough to receive a communication message.

Additionally, the antenna modules 418 and 432 can be configured operate in a transmit mode to provide a transmitted NFC communication signal. In transmit mode, filter 430 or switch network 434 can signal the NFC resonant circuit 422 to tune the single inductive coupling element 420 to produce an oscillating magnetic field that resonates at a predetermined resonance frequency which can be used to transmit an NFC communication signal 426 from the NFC/WPT module (such as NFC/WPT module 102) to another NFC enabled device. In this exemplary embodiment, WPT and/or NFC enabled communication device 408 may operate as an NFC receiver. In this exemplary embodiment, inductive coupling element 410 of the WPT and/or NFC enabled communication device 408 may, when placed in proximity to single inductive coupling element 420 in the oscillating magnetic field and tuned to the resonant frequency of the oscillating magnetic field, produce an induced current indicative of the NFC communication signal 426 transmitted by antenna module 418 or 432.

Figure 5:
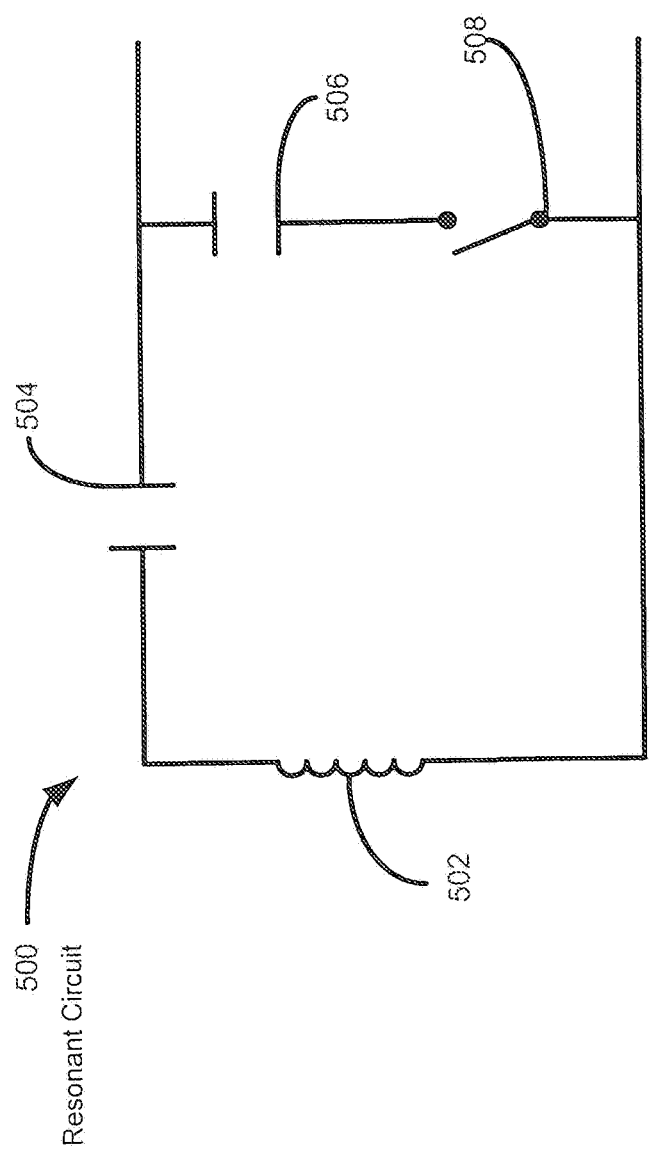
FIG. 5 illustrates an exemplary schematic representation of a duel resonant circuit for implementing WPT and NFC in accordance with various embodiments of the present disclosure.

FIG. 5 illustrates one exemplary embodiment of a dual resonant circuit 500, such as resonant circuit 404, for WPT and/or NFC communications according to various embodiment of the present disclosure. The dual resonant circuit 500 can comprise an Rx coil 502 and two resonant capacitances 504 and 506. Resonant capacitance 504 can be used to enhance WPT efficiency. Resonant capacitance 506 can be used to enable resonant detection at the appropriate frequency. An option output disconnect switch 508 can be included. If the switch 508 is included, the wireless power receiver, such as WPT Power Harvesting module 310, may operate the output disconnect switch 508 any time while the WPT transmitter applies a power signal. This can enable the wireless power receiver to keep its output connected if it reverts from a power transfer phase to an identification and configuration phase. If the output disconnect switch 508 is not included, the capacitance can be a fixed connection to the Rx coil 502.

While various embodiments of the present disclosure have been described above in the context of a wireless communication device operative in adjacent LTE and Industrial Scientific Medical (ISM) bands, it should be understood that they have been presented by way of example only, and not of limitation. For example, the systems and methods described herein may be applied to the same or other communication standards operative in adjacent or otherwise coexistent frequency bands, such as certain LTE and GNSS bands. It should be further understood that more or less circuitry, elements, such as radios, filters, switches, etc. may be implemented in a wireless communication device to effectuate communications over a variety of standards, protocols, etc. in accordance with various embodiments.

Likewise, the various diagrams may depict an example architectural or other configuration for the various embodiments, which is done to aid in understanding the features and functionality that can be included in embodiments. The present disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement various embodiments. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

It should be understood that the various features, aspects and/or functionality described in one or more of the individual embodiments are not limited in their applicability to the particular embodiment with which they are described, but instead can be applied, alone or in various combinations, to one or more of the other embodiments, whether or not such embodiments are described and whether or not such features, aspects and/or functionality are presented as being a part of a described embodiment. Thus, the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the terms "example" or "exemplary" are used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Moreover, various embodiments described herein are described in the general context of method steps or processes, which may be implemented in one embodiment by a computer program product, embodied in, e.g., a non-transitory computer-readable memory, including computer-executable instructions, such as program code, executed by computers in networked environments. A computer-readable memory may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

As used herein, the term module can describe a given unit of functionality that can be performed in accordance with one or more embodiments. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality. Where components or modules of the invention are implemented in whole or in part using software, in one embodiment, these software elements can be implemented to operate with a computing or processing module capable of carrying out the functionality described with respect thereto. The presence of broadening words and phrases such as "one or more," "at least," "but not limited to" or other like phrases in some instances shall not be read to mean that the narrower case is intended or required in instances where such broadening phrases may be absent.

What is claimed is:

1. A wireless power transfer and near field communication (WPT/NFC) enabled communication device, comprising:
   a resonant circuit configured to tune an inductive coupling element to a WPT frequency or to an NFC frequency; and
   a processor configured to:
   cause the resonant circuit to tune the inductive coupling element to approximately the WPT frequency such that a first current, indicative of a WPT communication signal, is induced in the inductive coupling element when the WPT/NFC enabled communication device is placed in a first magnetic field; and
   cause the resonant circuit to tune the inductive coupling element to approximately the NFC frequency such that a second current, indicative of an NFC communication signal, is induced in the inductive coupling element when the WPT/NFC enabled communication device is placed in a second magnetic field.

2. The WPT/NFC enabled communication device of claim 1, wherein the processor is configured to cause the resonant circuit to tune its resonant frequency from among a plurality of frequencies until the resonant frequency matches the WPT frequency or the NFC frequency.

3. The WPT/NFC enabled communication device of claim 1, wherein the resonant circuit is further configured to receive the WPT communication signal or the NFC communication signal from a second WPT/NFC enabled communication device communicatively coupled to the WPT/NFC enabled communication device.

4. The WPT/NFC enabled communication device of claim 1, wherein the resonant circuit is further configured to transmit the WPT communication signal or the NFC communication signal to a second WPT/NFC enabled communication device communicatively coupled to the WPT/NFC enabled communication device.

5. The WPT/NFC enabled communication device of claim 1, further comprising:
   a WPT/NFC module configured to process the WPT communication signal and the NFC communication signal.

6. The WPT/NFC enabled communication device of claim 5, wherein the WPT/NFC module is further configured to receive the first current when the inductive coupling element is tuned to approximately the WPT frequency or the second current when the inductive coupling element is tuned to approximately the NFC frequency.

7. The WPT/NFC enabled communication device of claim 6, wherein the WPT/NFC module is further configured to transmit the first current when the inductive coupling element is tuned to approximately the WPT frequency or the second current when the inductive coupling element is tuned to approximately the NFC frequency.

8. A wireless power transfer and near field communication (WPT/NFC) enabled communication device, comprising:
   a plurality of resonant circuits configured to tune an inductive coupling element to a WPT frequency or to an NFC frequency; and
   a processor configured to:
   cause a first resonant circuit from among a plurality of resonant circuits to tune the inductive coupling element to approximately the WPT frequency such that a first current, indicative of a WPT communication signal, is induced in the inductive coupling element when the WPT/NFC enabled communication device is placed in a first magnetic field; and
   cause a second resonant circuit from among a plurality of resonant circuits to tune the inductive coupling element to approximately the NFC frequency such that a second current, indicative of an NFC communication signal, is induced in the inductive coupling element when the WPT/NFC enabled communication device is placed in a second magnetic field.

9. The WPT/NFC enabled communication device of claim 8, wherein the processor is configured to cause the first resonant circuit to tune its resonant frequency from among a plurality of frequencies until a first resonant frequency matches the WPT frequency or the second resonant circuit to tune its resonant frequency from among a second plurality of frequencies until a second resonant frequency matches the NFC frequency.

10. The WPT/NFC enabled communication device of claim 8, wherein the first resonant circuit is further configured to receive the WPT communication signal from a second WPT/NFC enabled communication device communicatively coupled to the WPT/NFC enabled communication device, and wherein the second resonant circuit is further configured to receive the NFC communication signal from the second WPT/NFC enabled communication device communicatively coupled to the WPT/NFC enabled communication device.

11. The WPT/NFC enabled communication device of claim 8, wherein the first resonant circuit is further configured to transmit the WPT communication signal to a second WPT/NFC enabled communication device communicatively coupled to the WPT/NFC enabled communication device, and wherein the second resonant circuit is further configured to transmit the NFC communication signal to the second WPT/NFC enabled communication device.

12. The WPT/NFC enabled communication device of claim 8, further comprising:
a WPT/NFC module configured to process the WPT communication signal and the NFC communication signal.

13. The WPT/NFC enabled communication device of claim 12, wherein the WPT/NFC module is further configured to receive the first current when the inductive coupling element is tuned to approximately the WPT frequency or the second current when the inductive coupling element is tuned to approximately the NFC frequency.

14. The WPT/NFC enabled communication device of claim 12, wherein the WPT/NFC module is further configured to transmit the first current when the inductive coupling element is tuned to approximately the WPT frequency or the second current when the inductive coupling element is tuned to approximately the NFC frequency.

15. A method, comprising:
receiving a first magnetic field;
tuning an inductive coupling element to a Wireless Power Transfer (WPT) frequency, wherein the WPT frequency is approximately equal to a frequency of the first magnetic field;
recovering a power signal present in the first magnetic field;
receiving a second magnetic field; and
tuning the inductive coupling element to a Near Field Communication (NFC) frequency, wherein the first NFC frequency is approximately equal to a frequency of the second magnetic field.

16. The method of claim 15, wherein the tuning the inductive coupling element to the WPT frequency comprises:
tuning a resonant frequency of the inductive coupling element from among a plurality of frequencies until the resonant frequency matches the WPT frequency.

17. The method of claim 15, wherein the tuning the inductive coupling element to the NFC frequency comprises:
tuning a resonant frequency of the inductive coupling element from among a plurality of frequencies until the resonant frequency matches the NFC frequency.

18. The method of claim 15, wherein the receiving the first magnetic field comprises:
inducing a first current onto the inductive coupling element, and
wherein the receiving the second magnetic field comprises:
inducing a second current onto the inductive coupling element.

19. The method of claim 18, further comprising:
charging a battery using the first current.

20. The method of claim 18, further comprising:
recovering information from the second current.

* * * * *